United States Patent [19]

Zentner et al.

[11] 4,222,918

[45] Sep. 16, 1980

[54] AQUEOUS EMULSIONS, METHODS OF MAKING THE SAME AND IMPREGNATED ROVINGS MADE FROM THE EMULSIONS

[75] Inventors: Mark R. Zentner, Mount Prospect; Edward P. Zahora, Naperville; Angelo F. Leo, Palatine, all of Ill.

[73] Assignee: DeSoto, Inc., Des Plaines, Ill.

[21] Appl. No.: 21,942

[22] Filed: Mar. 19, 1979

[51] Int. Cl.$^2$ ............................................. C08L 63/00
[52] U.S. Cl. ............................. 260/29.2 EP; 428/378; 428/417; 525/396; 525/398; 525/523; 525/906
[58] Field of Search ..................... 260/29.2 EP, 830 R, 260/830 S, 836, 837 R; 525/906

[56] References Cited

U.S. PATENT DOCUMENTS

| | | | |
|---|---|---|---|
| 2,872,427 | 2/1959 | Schroeder | 260/29.2 EP |
| 3,819,472 | 6/1974 | Vasta | 260/830 S |

FOREIGN PATENT DOCUMENTS 1284775  8/1972  United Kingdom .................... 260/29.2

*Primary Examiner*—Theodore E. Pertilla
*Attorney, Agent, or Firm*—Dressler, Goldsmith, Shore, Sutker & Milnamow, Ltd.

[57] ABSTRACT

Aqueous impregnating emulsions for the impregnation of fibrous rovings are provided in which water has emulsified therein particles of epoxy resin in compatible admixture with thermoplastic resin, and a curing agent for the epoxy resin is dispersed in the emulsion, the curing agent being nonreactive under ambient conditions, such as dicyandiamide. Polysulfone resins are preferably used by dissolving them in methylene chloride and then evaporating this solvent after the epoxy resin has been dissolved in. Polycarboxylic acid emulsifying agents provide superior properties in the cured product.

17 Claims, No Drawings

AQUEOUS EMULSIONS, METHODS OF MAKING THE SAME AND IMPREGNATED ROVINGS MADE FROM THE EMULSIONS

DESCRIPTION

1. Technical Field

The present invention relates to aqueous emulsions, the production thereof, and to the impregnation of fibrous rovings using such emulsions.

2. Background Art

The impregnation of fibrous rovings is known, but the usual impregnating compositions involve solutions of resins in organic solvents. Since the resins used for impregnation are frequently intended to thermoset (become solvent insoluble on elevated temperature exposure), the solvents must be low boiling. Since difficultly soluble thermoplastic resins of relatively high molecular weight are desirably present in admixture with the thermosetting resin to make it more rubbery, the low boiling organic solvent is typically methylene chloride which is evaporated from the impregnated roving and lost to the atmosphere. The use of methylene chloride under these conditions introduces expense and pollution problems which are desirably avoided. The possible use of aqueous impregnants has also been contemplated, but the preferred thermoplastic resins do not dissolve or disperse in water or in innocuous water miscible solvents, and resin adhesion to the fibers has been difficult to obtain when aqueous impregnants are used, so the final physical properties of the resin-fiber composite have been impaired.

Disclosure of Invention

In this invention an epoxy resin, which is preferably liquid at room temperature, is combined with a thermoplastic resin, preferably in an organic solvent of limited miscibility in water, and the combination of resins is emulsified in water with the aid of a surfactant. A latent curing agent is incorporated in the emulsion, preferably dicyandiamide dissolved in the water, which is the continuous phase of the emulsion. In the contemplated use, the fibrous roving is passed through the aqueous emulsion to impregnate the same, whereupon the impregnated roving is dried to remove the water and any cosolvent present.

The invention has several features. Thus, anionic surfactants, and especially carboxyl-functional emulsifying agents, provide superior results. Also, polysulfone resins are preferred for combination with the epoxy resin, and it has been found that these can be combined to form a solution in one another with the aid of methylene chloride which is removed to form a hot melt which can be emulsified in water containing an emulsifying agent without added solvent, or this melt can be dissolved in 2-ethoxy ethanol acetate which is not capable of dissolving the thermoplastic resin directly. Further, the dicyandiamide and catalyst are dissolved in water and added to the preformed emulsion, and this provides better distribution of the curing agent than can be obtained by the conventional technique of grinding the dicyandiamide in the organic solvent.

It is desired to point out that this invention is an improvement over the fibrous roving production disclosed in the commonly owned copending application of R. L. Brook, Ser. No. 557,656, filed Mar. 12, 1975. In this prior application, the rovings are impregnated with uncured epoxy resin in semi-solid form and then the impregnated roving is overcoated with a skin coat of thermoplastic resin to detackify the material and to allow the product to be wound on a roll for storage and later use in the formation of fabrics using textile equipment. For some purposes textile handling can be dispensed with, and so can storage stability, while retaining a product of limited utility. One feature of this invention is the finding that fibrous rovings impregnated with epoxy resin-polysulfone-dicyandiamide combinations using aqueous emulsions in this invention possess reduced surface tack so that the need for overcoating is minimized, and in some circumstances it can be dispensed with while retaining sufficient freedom from stickiness as will enable the impregnated and dried roving to unwind from its storage spool (usually with the aid of a talc tack-reducing dusting). Thus, water application per this invention can considerably change and simplify the use of preimpregnated fibrous rovings.

Referring first to the epoxy resins which are used herein, any polyepoxide having a molecular weight below about 1000 may be used, but those which are liquid or semi-solid at room temperature are preferred. The diglycidyl ethers of a bisphenol, preferably bisphenol A, are particularly preferred, especially those having a molecular weight of from about 350 to about 450, more preferably 370-400. A particularly preferred epoxy resin used in the Examples hereinafter is Araldite 6010 (Ciba-Geigy), but the Shell product Epon 828 is also quite useful. Higher molecular weight epoxy resins are usable along with organic solvents to liquify the resinous component of the emulsion.

As is well known, the epoxide group in the above materials is the 1,2-oxirane group.

Dicyandiamide is a latent epoxy curing agent that has a solubility in water of 4.13 g/100 g $H_2O$ at 25° C. Its structure is:

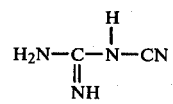

This curing agent is insoluble in most organic solvents and in most solvent systems it is dispersed or ground in with the epoxy resin, and thus would be expected to have a much larger particle size than if it came out of solution in water as in this invention.

The dicyandiamide curing agent is used herein in an amount of about 2-15% of the weight of the epoxy resin, preferably about 4-10%.

The dicyandiamide curing agent can be used alone, but it is another feature of this invention to dissolve it in the aqueous phase of the emulsion together with a water soluble catalyst for the epoxy-dicyandiamide reaction to reduce the gel time of the system during the final thermal cure to produce the desired fiber composite. A salt of a dicarboxylic acid, like adipic acid, with imidazole, will illustrate a water soluble catalyst which may be used, this product being available under the trade designation ADX-85 (Hysol).

Other curing agents which are stable in the emulsion under ambient conditions are trimellitic anhydride, pyromellitic anhydride and chlorendic anhydride.

The thermoplastic resin which is used should be a solid resin which is soluble in the epoxy resin to form a compatible hot melt. Its purpose is to make the epoxy resin less brittle and more rubbery. It also serves to increase the solidity of the mixture when a liquid epoxy resin is used, and thus to reduce tackiness. This allows the impregnated and dried roving to be handled. High molecular weight normally solid aromatic polyethers, preferably based on bisphenol A, are generally useful for blending with the epoxy resin, the Shell product Epinol 55-B-40 being illustrative of phenoxy polymers which are available from several suppliers. Other illustrative thermoplastic resins are vinyl resins such as Formvar and Butvar (polyvinyl formal and polyvinyl butyral) resins from Monsanto are also useful. Nitrile rubbers, such as Hycar 1472, can also be used.

Polysulfone resins are particularly desirable for combination with the epoxy resin and are especially difficult to use. These resins have the formula:

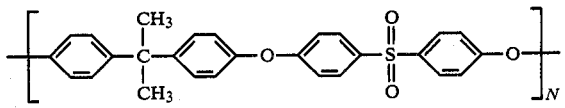

where N indicates the number of repeating units in the polymer which can range from about 30 to about 300. It will be appreciated that this formula has been based on the use of bisphenol A, but other bisphenols can be used.

Polysulfone resins are high molecular weight thermoplastic resins of the above described type. The commercial product Polysulfone P-1700 supplied by Union Carbide is preferred and it has the formula shown. The product in commerce has a $T_g$ (glass transition temperature) of about 350° F., and has a value for N in the formula in the range of 60–120.

The polysulfone resin or other thermoplastic resin is desirably used from 10% to 60% of the weight of the epoxy resin, preferably from 20%–45% of the weight thereof.

While the combination of some of the thermoplastic resins with the epoxy resin is not difficult (a simple hot melt with or without the assistance of a small amount of solvent), the combination of the polysulfone resin with the epoxy resin introduces a formidable difficulty. This is because the polysulfone resin does not easily dissolve in the epoxy resin, and the solvents which are desired, like 2-ethoxy ethanol acetate, do not dissolve the polysulfone resin.

In this invention, the epoxy resin and the polysulfone resin are first dissolved in a volatile solvent which is a solvent for both. Methylene chloride is particularly contemplated as the common solvent. When this common solvent is used and then evaporated, a solution is obtained and 2-ethoxy ethanol acetate can be added to this solution, preferably after removal of the common solvent, if desired.

The resin systems are typically prepared as follows. A dilute (10% to 35%, preferably 15% to 30%) solution of polysulfone resin in the common solvent (methylene chloride) is prepared. Methylene chloride is preferred because it has a low boiling point (104° F.) and it is one of the few available solvents for the polysulfone resin. The epoxy resin is charged to a reactor and the polysulfone resin solution is added with stirring. When the mixture is uniform, heat is applied and the methylene chloride is distilled off. The mixture is kept at about 200° F. until the methylene chloride is all collected to provide a compatible mixture which does not separate on cooling. The recovered methylene chloride can be reused. For the solvent-free emulsion system, the epoxy-sulfone resin hot melt is drained out of the reactor and can be emulsified with water containing emulsifying agent using high shear equipment, such as a Hockmeyer mixer. The epoxy-polysulfone compatible mixture is a rubbery solid at room temperature and must be heated to about 180° F. to lower the viscosity enough for direct emulsification.

For the solvent-containing resin emulsion, 2-ethoxy ethanol acetate is fed into the reactor containing the epoxy-polysulfone hot melt, and the temperature is kept at about 200° F. using reflux conditions. The 2-ethoxy ethanol acetate can be stirred in to form a solution with the epoxy-polysulfone mixture. This resin solution can be emulsified in water at room temperature which is one of the advantages of using the solvent-containing system. Polysulfone P-1700 itself is insoluble in 2-ethoxy ethanol acetate, but by forming a solution of it with the epoxy resin, 2-ethoxy ethanol acetate can be added to form a clear compatible solution. The polysulfone resin cannot be added directly to the epoxy resin, but must first be dissolved in a solvent that is compatible with both the epoxy resin and the polysulfone.

2-ethoxy ethanol acetate is a water miscible cosolvent that lowers the viscosity of the resin system before emulsifying. Its solubility in $H_2O$ at 20° C. by weight is 22.9%.

The resin system with 2-ethoxy ethanol acetate has several advantages over the solvent-free system. It foams much less when stirred, it settles at a much slower rate when stationary, and the emulsion is creamier and flows out more smoothly. Both systems, however, work adequately for impregnating fibers.

While any surfactant can be used to stabilize the emulsion, polycarboxylic acid anionic emulsifying agents provide an adequately stable emulsion without impairing the final properties of the cured fiber composite. Emulsifying agents generally lower the strength of the cured composite. Preferred polycarboxylic emulsifiers have the formula:

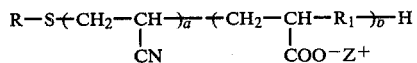

where R is a long chain alkyl group containing 4–20 carbon atoms, $R_1$ is methylene or nothing, and Z is ammonia or an alkali metal, such as sodium or potassium, and a and b have a ratio of 9:1 to 1:1 and together provide a molecular weight of about 500–5000. The Uniroyal product Polywet KX-4 having the above formula in which R is octyl, $R_1$ is methyl, Z is potassium, and the average molecular weight is about 1500 is preferred and used as illustrative. The ratio of a/(a+b) in this product is about 0.5.

Very little surfactant is needed, about 3% to 5%, based on the weight of the resins which are emulsified being adequate.

The dicyandiamide and water soluble catalyst in water solution are added to the preferred emulsion and a superior and more intimate blend (compared to solvent applied systems) is provided when the emulsion is applied to fibers and the volatiles are evaporated.

The invention is illustrated in the following examples.

BEST MODE FOR CARRYING OUT THE INVENTION

| Parts by Weight | Component |
|---|---|
| 60 | Diglycidyl ether of bisphenol A (liquid epoxy resin having an epoxy equivalent weight of about 175) [Araldite 6010] |
| 20 | Polysulfone P-1700 |
| 20 | 2-ethoxy ethanol acetate |
| 10 | Polywet KX-4 polycarboxylic anionic emulsifying agent defined earlier |
| 4.6 | Dicyandiamide |
| 0.09 | Water soluble salt of adipic acid and imidazole (catalyzes cure) |
| 100 | Deionized water (used to dissolve dicyandiamide and adipic acid salt) |
| 8 | Deionized water (used to lower viscosity of the Polywet KX-4) |

The Polysulfone P-1700 is dissolved in methylene chloride to provide a 25% solution. The epoxy resin is charged to a reactor equipped for stirring, distillation, and reflux, and the polysulfone resin solution is added and stirring is started. When a uniform mixture is provided, heat is applied and methylene chloride is distilled off and the mixture is kept at about 200° F. until the methylene chloride is all collected. If it is desired to provide a solvent-free system, the compatible hot blend which has now been formed is drained out of the reactor and emulsified. In this example, the 2-ethoxy ethanol is fed into the reactor and the temperature is kept at about 200° F., reflux is started and the mixture is stirred to form a solution. This resin solution can be emulsified in water at room temperature which is an advantage. If no solvent is added, the hot melt at 180° F. is subjected to high shear in admixture with water in order to form the desired emulsion.

The Polywet KX-4 is reduced to about 20% solids content with the water to lower its viscosity and it is mixed with either the hot melt or the cooled solvent solution under high shear to form the desired aqueous emulsion.

The dicyandiamide and the catalyst are dissolved in the 100 parts of water with stirring. Heat can be used to aid dissolution, but the temperature cannot exceed 130° F. This solution is then simply stirred into the previously formed emulsion.

To recapitulate, the polysulfone resin was dissolved in methylene chloride and the epoxy resin is dissolved in the solution whereupon the methylene chloride solvent is distilled off to provide a hot melt. This hot melt can be used as such, but it is easier to add the 2-ethoxy ethanol acetate solvent to form a solution which is cooled. The polycarboxylic acid emulsifying agent is then provided in dilute aqueous solution which is added to the solvent solution with high shear stirring to provide an emulsion.

The emulsions obtained both with and without the use of 2-ethoxy ethanol acetate solvent were then applied to type 30 E fiberglass roving supplied by Owens Corning.

The fibers impregnated with the described emulsion systems were composite rovings. In one instance two of the noted fiberglass rovings were combined (a 675 yield and a 1800 yield were combined to make a 491 yield glass fiber strand) [yield indicates the number of yards of the roving to provide one pound]. Also, two strands of 6K Thornel graphite yarn were combined to make one 12K roving. This graphite yarn is supplied by Union Carbide and is produced from polyacrylonitrile fiber.

The impregnation of the glass fiber combined roving starts by feeding the roving out of the dry package and running it over and under two rods to break up the sizing applied by the manufacturer. This allows the fiber to be impregnated more uniformly and is not needed for graphite roving.

The rovings are then passed through an impregnating tank which holds about two gallons of emulsion which was stirred occasionally with a spatula. The tank is about 2 feet long, 16 inches wide, and 4 inches deep, and has a series of steel rods that run the width of the tank about an inch from the bottom. The roving is run over and under these rods for better impregnation and wetting by the resin emulsion. The amount of resin on the roving is controlled by an adjustable wiper blade as the roving comes out of the tank.

After passing the wiper blade, the impregnated roving is passed up a vertical 18 foot tower, over a pulley, and back down the tower, under a pulley and up and down a second tower of the same height. Hot air at about 310° F. is blown through these towers to evaporate off the water and solvent (if used in making the emulsion. A dwell time of about 3 minutes in these towers is adequate to remove the volatile components and the dicyandiamide is not reacted.

The roving then goes through a nip roll which flattens it. At this point, the impregnated roving was less tacky than the previously prepared solvent solution-impregnated roving and the skin coat tank and drying tower which were formerly needed were bypassed, though this would not be done in preferred practice. The impregnated roving was then lightly dusted with talc and wound up into packages.

In prior practice using solvent solutions, a skin coat of a solution of a phenolic resin in methanol solution was applied and the methanol was evaporated off before the impregnated roving was packaged. This light phenolic novalac skin coat prevents stickiness and allows the roving to be wound into small packages called cops and to be subsequently braided. Without the skin coat, the impregnated roving made with the aqueous emulsions of this invention were successfully wound onto cops and braided. Nonetheless, application of a skin coat reduces sticking on storage and insures the capacity to enable textile handling, so a skin coat is desirably applied. It is surprising to be able to omit the skin coat and thereby provide minimum useful characteristics.

Both emulsion systems worked well, but the emulsion containing the 2-ethoxy ethanol acetate solvent flowed out more evenly on the fibers and the product without the skin coat was less tacky. About 48% resin by weight was applied to the graphite roving and 30% to 35% resin was applied to the glass fiber roving. The impregnated rovings were subjected to heat (350° F.) and pressure in a mold to produce specimens for test and these were compared with the prior solution impregnated rovings.

Using the glass fiber composite strand described earlier, the prior solution impregnation out of methylene chloride produced shear strengths of 11,000 psi. and higher. Adding Pluronic F-127 nonionic surfactant in an amount of 0.5% of resin solids to the methylene chloride solution lowered the shear strength of the product to 7,600 psi. The aqueous emulsion of this invention containing 2-ethoxy ethanol acetate solvent and using 3% Pluronic F-127 surfactant to emulsify the resins gave a shear strength of 6,500 psi. Using the same system with 5% Polywet KX-4 as the surfactant instead of the Pluronic F-127, the shear strength returned to the level of the control, namely, 11,400 psi. on the average.

What is claimed is:

1. An aqueous emulsion comprising water having emulsified therein particles of epoxy resin which is a polyepoxide containing more than one 1,2-oxirane group in compatible admixture with thermoplastic resin, and a curing agent for said epoxy resin dispersed in said emulsion, said curing agent being nonreactive with said epoxy resin in said emulsion under ambient conditions.

2. An aqueous emulsion as recited in claim 1 in which said curing agent is dissolved in the water.

3. An aqueous emulsion as recited in claim 1 in which said curing agent is dicyandiamide.

4. An aqueous emulsion as recited in claim 1 in which said particles of epoxy resin in compatible admixture with thermoplastic resin are in solution in an organic solvent of limited miscibility in water.

5. An aqueous emulsion as recited in claim 4 in which said organic solvent is 2-ethoxy ethanol acetate.

6. An aqueous emulsion as recited in claim 1 in which said epoxy resin is liquid at room temperature.

7. An aqueous emulsion as recited in claim 1 in which said particles of epoxy resin in compatible admixture with said thermoplastic resin are emulsified by means of a polycarboxylic acid anionic emulsifying agent.

8. An aqueous emulsion as recited in either one of claims 1–7 in which said thermoplastic resin is a polysulfone resin present in an amount of from 10% to 60% of the weight of the epoxy resin.

9. An aqueous emulsion as recited in claim 8 in which said polysulfone resin has the formula:

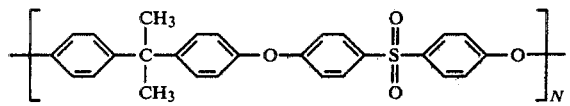

wherein N ranges from about 30 to about 300, and said polysulfone resin is present in an amount of from 20% to 45% of the weight of the epoxy resin.

10. A method of producing an aqueous emulsion of epoxy resin which is a polyepoxide containing more than one 1,2-oxirane group in compatible admixture with thermoplastic resin comprising dissolving said thermoplastic resin in a volatile solvent for both resins to produce a solution, dissolving said epoxy resin in said solution, evaporating said volatile solvent to produce a compatible hot melt mixture, and then emulsifying said mixture into water containing an emulsifying agent.

11. A method as recited in claim 10 in which said compatible mixture is emulsified in the form of an essentially solvent-free hot melt.

12. A method as recited in claim 10 in which said compatible mixture is emulsified in the form of a solution of an organic solvent of limited miscibility in water.

13. A method as recited in claim 10 in which said thermoplastic resin is a polysulfone resin and said volatile solvent is methylene chloride.

14. A method as recited in claim 13 in which said organic solvent of limited miscibility in water is 2-ethoxy ethanol acetate.

15. A method as recited in either one of claims 10–14 in which said emulsifying agent is a polycarboxylic acid anionic emulsifying agent.

16. A method as recited in claim 15 in which said emulsifying agent has the formula:

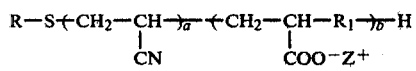

where R is an alkyl group containing 4–20 carbon atoms, $R_1$ is methylene or nothing, and Z is an alkali metal, and a and b have a ratio of 9:1 to 1:1 and together provide a molecular weight of about 500–5000.

17. A method as recited in claim 10 in which a water solution of dicyandiamide is incorporated in said aqueous emulsion.

* * * * *